United States Patent [19]

Knedlik

[11] 4,381,099
[45] Apr. 26, 1983

[54] FAUCET FOR FROZEN CARBONATED BEVERAGE MACHINE

[75] Inventor: Omar S. Knedlik, Coffeyville, Kans.

[73] Assignee: The Penmont Company, Baton Rouge, La.

[21] Appl. No.: 258,290

[22] Filed: Apr. 28, 1981

[51] Int. Cl.³ .................. F16K 31/143; F16K 31/122
[52] U.S. Cl. ........................ 251/14; 92/13.8; 222/504; 222/525; 251/30; 251/63.6; 251/284; 251/325
[58] Field of Search .................... 92/2, 5 R, 13.8; 222/504, 525; 251/14, 30, 63.6, 284, 324, 325

[56] References Cited
U.S. PATENT DOCUMENTS

| 2,299,211 | 10/1942 | Clench | 92/13.8 |
| 3,244,399 | 4/1966 | Jones et al. | 251/327 |
| 3,590,839 | 7/1971 | Moore | 251/325 |
| 3,731,905 | 5/1973 | Piet | 251/284 |
| 3,806,084 | 4/1974 | Seese | 251/63 |
| 3,937,247 | 2/1976 | Van der Wal | 251/325 |
| 4,145,025 | 3/1979 | Bergeron | 251/63.6 |
| 4,267,947 | 5/1981 | Wasserstrom | 222/504 |
| 4,289,294 | 9/1981 | McLean | 251/14 |

Primary Examiner—George L. Walton
Attorney, Agent, or Firm—Cushman, Darby & Cushman

[57] ABSTRACT

An FCB-making machine is provided with an adjustable faucet that is energized by a pressurized fluid such as carbon dioxide or air, which is controlled by a momentary-contact switch-actuated three-way solenoid valve. Dispensing is started by depressing the switch and terminated by releasing the switch (or automatically). By using this valve many conventional liquid drink dispensers, milkshake freezers and similar machines may be converted to the production of FCB's. A provision is made for performing faucet seal repairs without affecting the pressure or contents of the machine.

7 Claims, 2 Drawing Figures

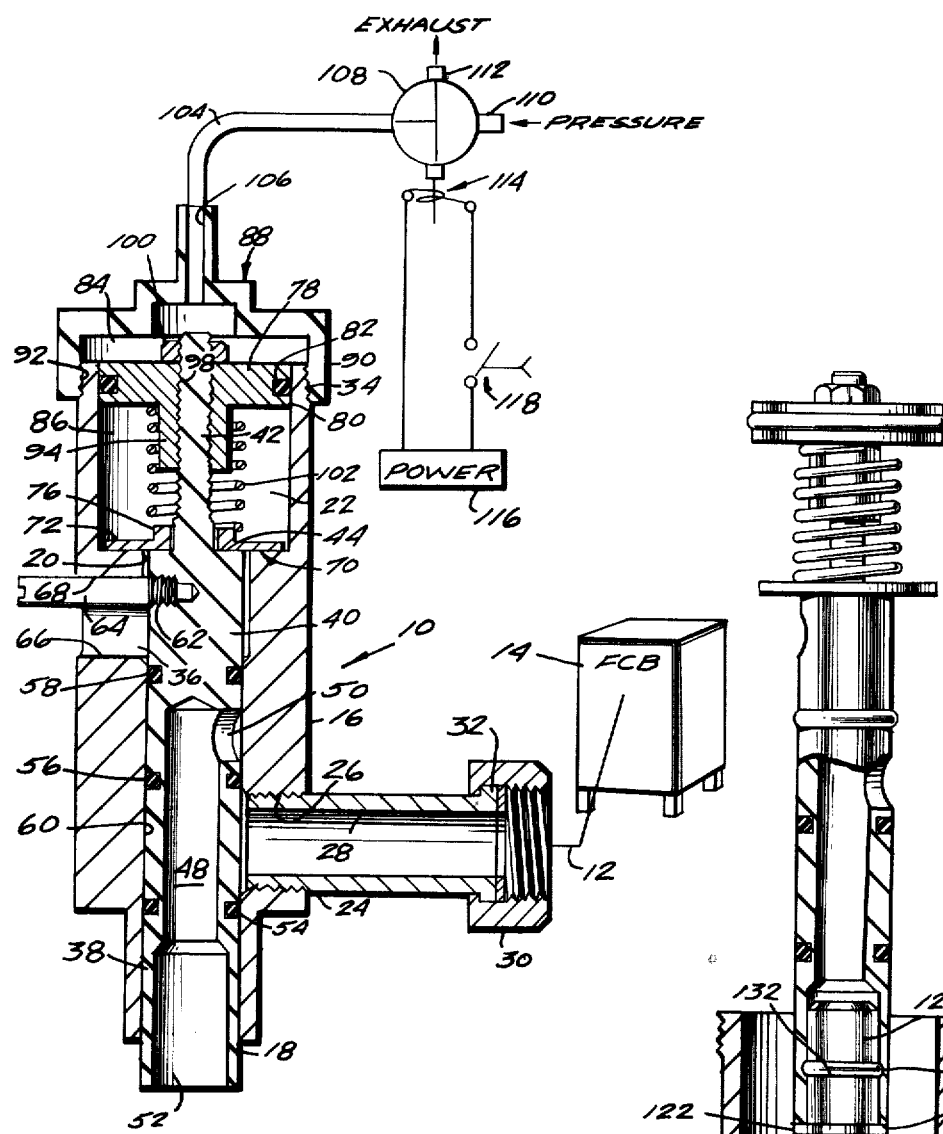
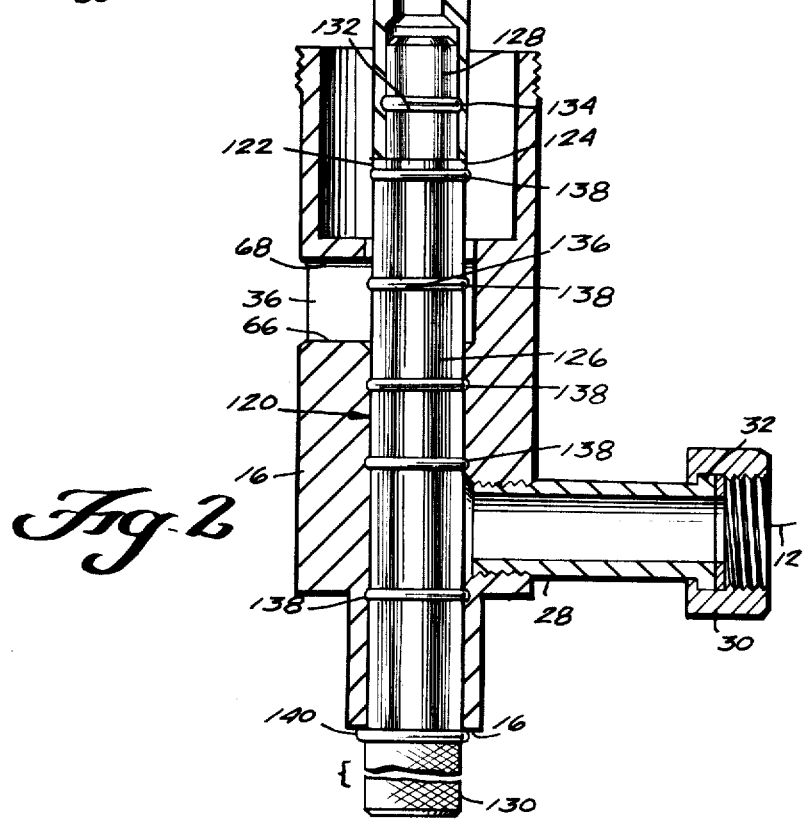
Fig. 1
Fig. 2

FAUCET FOR FROZEN CARBONATED BEVERAGE MACHINE

BACKGROUND OF THE INVENTION

Frozen carbonated beverages (FCB's) are a relatively new type of soft drink, but they appear to have caught-on well and to have built a strong and growing market. In general, this product combines some of the more desired features of conventional carbonated soft drinks and soft serve frozen confections (such as soft serve fruit-flavor sherbet). One brand of frozen carbonated beverage which may be most widely known is the Slurpee ® product of Southland Corporation's 7-Eleven Stores. Generally the beverage is dispensed from a machine which at least to a consumer looks no different from a dispenser for conventional soft serve frozen confections. However, the beverage generally is dispensed into cups, rather than into a choice of cups or edible cones, and usually is sipped through a straw as carbonated slush although sometimes it is also spooned out and/or its partially melted fraction imbibed as a liquid.

In fact, conventional apparatus for making and dispensing non-carbonated soft-serve frozen confections, milkshakes and the like usually cannot be successfully used as-is to make and dispensing frozen carbonated beverages. The basic difference which needs to be accommodated is that in the manufacture and dispensing of FCB's, the product is injected with considerable gas pressure, e.g. 40 p.s.i., for the purpose of dissolving and entraining carbonating gas in the beverage. Accordingly adapters have been devised for injecting carbon dioxide into the mix, and/or for accommodating the introduction of pre-carbonated mix into the freezing chamber. For instance, a Procon carbonator pump from Standex International, Salem, N.H., can be connected to a conventional milkshake-making machine. Various faucet modifications have been proposed for dispensing FCB from the making machine.

When FCB's were introduced, it was the general practice for all dispensing from the machines to be performed by store/restaurant employees for the customers and highly unusual for the machines to be located where or under such conditions that the customers could or might be expected to serve themselves. That practice is now changing and it seems that the marketplace would favor the introduction of FCB dispensers which could be consumer-operated, much as are coin-operated soda machines and the like. Heretofore, the faucets of most, if not all FCB dispensers have been tricky enough to operate that a certain amount of prior training in use has been practically a necessity, except where trained operators were always at hand to offer guidance and to clean up the results of inadvertent spillage by customers.

In any event, a need has arisen for a better facuet for FCB dispensers, one that will better control flow from the FCB-making machines, to make dispensing easier and more accurate, especially for people not familiar with FCB-making machines.

SUMMARY OF THE INVENTION

An FCB-making machine is provided with an adjustable faucet that is energized by a pressurized fluid such as carbon dioxide or air, which is controlled by a momentary-contact switch-actuated three-way solenoid valve. Dispensing is started by depressing the switch and terminated by releasing the switch (or automatically). By using this valve many conventional liquid drink dispenser, milkshake freezers and similar machines may be converted to the production of FCB's. A provision is made for performing faucet seal repairs without affecting the pressure or contents of the machine.

The principles of the invention will be further discussed with reference to the drawing wherein a preferred embodiment is shown. The specifics illustrated in the drawings are intended to exemplify, rather than limit, aspects of the invention as defined in the claims.

BRIEF DESCRIPTION OF THE DRAWING

FIG. 1 is a longitudinal sectional view, partly in schematic form, of a faucet of the present invention connected to a FCB machine.

FIG. 2 is a similar longitudinal sectional view of the faucet, showing removal of the faucet core using a change tool.

DETAILED DESCRIPTION

At 10 in FIG. 1 there is shown a faucet of the present invention, mounted to the outlet conduit 12 of a FCB-making machine 14 that is otherwise conventional and not further described herein.

The faucet 10 is shown including an upright housing or barrel 16 having a vertical throughbore 18, which is abruptly enlarged at 20 to provide an axially upwardly facing annular shoulder and a cylinder 22.

Below the shoulder 20 the bore 18 is of generally constant diameter.

Near the lower end of the faucet barrel, a laterally extending opening 24 is formed through the barrel so that it intersects the bore 18. A band of internal threading 26 is provided on the barrel in the opening so that an inlet port nipple 28 can be threadedly connected to the barrel as a side arm projecting therefrom. An internally threaded union 30 provided on the flanged outer end 32 of the nipple 28 serves to mount the faucet 10 to the outlet conduit 12 of the FCB-making machine 14.

The faucet barrel 16 is externally provided at its upper end with a band of threading 34.

Intermediate its upper end and the inlet port the barrel is shown provided with a vertically elongated slot 36 which extends through from the outside to the bore 18.

A faucet core 38 in the nature of a slide valve body is slidingly received in the bore 18.

The core 38 is shown comprising a generally cylindrical rod having a longer main portion 40 of a larger outer diameter and an axially shorter upper, stem portion 42 of a smaller diameter, the transition being abruptly provided at an annular, axially upwardly facing shoulder 44. A band of external threading 46 is shown provided on the stem 42.

The core 38 further includes an outlet port passageway 48 which laterally enters the core midway up the main portion 40 at 50, then turns to the axial direction and exits coaxially out of the lower end of the core at 52. It is under this hollow lower end, which is visible below the barrel 16 that a cup is placed to be filled with FCB.

In the closed position of the faucet shown in FIG. 1, the entrance 50 to the outlet port passageway 48 is axially displaced above the level where the inlet port 24 communicates with the bore 18, and the core shoulder 44 is level with the barrel shoulder 20. O-rings 54, 56 and 58 provided in respective radially outwardly opening circumferential grooves in the main portion of the core 38 seal annularly between the faucet core and barrel bore peripheral wall 60 respectively below the inlet port 24, between the inlet port and the entrance 50 to the outlet port passageway 48, and between the entrance 50 and the slot 36.

The main portion of the core is shown further provided with a laterally opening, internally threaded socket 62 which is exposed through the slot 36. A guide pin 64, when threaded into the socket 62 while remaining protuberant in the slot acts to maintain the desired angular orientation of the core relative to the barrel. Vertical sliding of the core 38 is limited in both directions by engagement of the pin with the barrel at vertically opposite ends 66, 68 of the slot 36. As is apparent, in the closed position shown in FIG. 1, the core is relatively elevated, so that the guide pin 64 is at the upper end 66 of the slot 36. The core 38 may be slid down, e.g. until the pin 64 contacts the lower end of the slot 36. At this depressed level of the core, the entrance 50 to the outlet port passageway is in open communication with the inlet port 24 by being at least partially laterally aligned therewith. Accordingly, FCB may flow under pressure from the FCB-making machine 14 and out of the spout 52, until the core is raised toward its shown, closed position sufficiently to cut-off this communication between the inlet and outlet ports.

When the core is at its depressed level, the seal rings 56 and 58 seal between the core and barrel above and below the inlet port.

Within the cylinder 22, the faucet 10 is shown provided with an annular spring seat plate 70 in the form of a flat disk 72 having a central opening 74 integrally provided with an upstanding perimetrical flange 76.

A piston 78 is slidingly received in the cylinder 22. The radially outwardly facing outer circumferential surface 80 of the piston 78 is shown provided with an O-ring 82 received in a corresponding radially outwardly opening groove formed in the surface 80 intermediate the axial extent thereof. The sealing 82 is in sliding and/or rolling, sealing contact with the cylinder 22 peripheral wall 82, thereby dividing the cylinder 22 into a first chamber 84 above the piston 78, and a second chamber 86 below the piston 78. The lower chamber 86, effectively, is vented to atmospheric pressure by the absence of seals between the lower chamber 86 and the slot 36, to the extent that the piston can be slid up and down in the cylinder without more than an acceptable, desirable shock-absorbing function being served by air compressed and expanded in, drawn into and expelled from the lower chamber.

The upper end of the cylinder 22 is sealingly closed by a removable cap 88, the skirt 90 of which has its band of internal threading 92 threaded onto the band of external threading 34 on the upper end of the barrel 16.

The piston 78 is shown including a coaxially downwardly extending integral tail 94 that has an axial throughbore 96 that is internally threaded at 98. Accordingly, the piston 78 is mounted on the faucet core 38 by being threaded onto the stem at 98/46. The band of threading 46 is effectively axially longer than the band of threading 96, so that the axial position of the piston 78 along the stem 42 can be selectively adjusted. A lock nut 100 may be threaded onto the stem 42 after the piston 78 in order to maintain the selected axial positioning of the piston on the stem.

The faucet 10 is further shown with means for biasing the piston upwardly towards the cylinder cap, a position which (as shown) corresponds to the closed condition of the valve. This means is shown having the form of a compression coil spring 102 coaxially received about the piston tail 94 and the spring seat plate flange 76, with its opposite ends respectively positioned to press against the piston and the spring seat plate.

Whereas the guide pin 64 by contact with opposite ends of the slot 36 provides absolute limits to upward and downward axial movement of the core 38, the actual, normal operating characteristics of the faucet can be subject to regulation by providing tighter limits as follows. Firstly, by preference, the compression coil spring 102 is preferably so sized that as the piston moves downwards the series of coils becomes fully axially resiliently compressed (eliminating the spaces between adjacent turns) slightly before the guide pin 64 can reach the lower end of the slot 36, so that normally the achievement of full compression rather than the pin/slot end abutment provides the effective limit to downward travel of the faucet core 38. Secondly, adjustment of the position of the piston on the stem 42 at 98/46, described hereinbefore, correspondingly increases and decreases the reaction time for beginning and extinguishing dispensing through the faucet, by increasing and decreasing the volume of the upper chamber 84.

For the purpose of pressurizing the upper chamber 84 in order to force the piston/core assembly to travel downward thus opening the faucet, and for venting the once-pressurized upper chamber 84 in order to permit the compressed spring 102 to return the piston/core assembly to its upper, shown, position, thus closing the faucet, a conduit 104 is communicated to the upper chamber 84. In the embodiment shown, the control line 104 is fitted in a port 106 provided in the cylinder cap 88. The control line 104 is shown provided with a three way valve 108 for selectively alternatively connecting the control line 104 with a source 110 of fluid pressure, e.g. compressed air, and a fluid pressure exhaust line 112, e.g. a vent to atmosphere.

By preference, as shown, the valve 108 is a solenoid-operated valve having the coil of its solenoid 114 connected in electrical circuit with an electric power supply 116. Also in this circuit is a momentary contact switch 118. This may be of the conventional doorbell button type, where electrical current flows in circuit so long as the switch remains pushed, or of the conventional type which when pushed remains closed only for a pre-set amount of time, regardless of whether its actuator button remains pushed or is only momentarily pushed.

The normal position of the valve 108 is illustrated in FIG. 1. That is, if the switch button is not pushed, the control line 104 remains vented and the faucet remains closed. If the switch button is pushed, the valve 108 temporarily rotates to connect the control line 104 to the source 110 of fluid pressure, thus temporarily opening the faucet 10, and causing FCB to be dispensed therethrough from the FCB-making machine 14. The solenoid-operated valve 108 is conventionally equipped with a spring means or the like (not shown in detail) for restoring the valve 108 to the venting position shown (thus closing the valve), at the conclusion of each actuation of the switch 118.

The nature of the FCB product is that it is rough on the faucet seals. Thus in due course, long before the faucet 10 is otherwise appreciably worn, one or more of the seal rings 54, 56, 58 and 82 will have become so worn that it needs to be replaced. Because of the pressure in the FCB-making machine, typically 40 p.s.i. it is not feasible to merely dismount the faucet if the leakage problem happens to arise when the machine 14 is full of pressurized FCB product. Yet it is not always feasible to let the faucet continue to leak until the machine is empty or can be emptied. Thus, it is important that the faucet 10 is so constructed that its piston, core assembly can be removed without losing pressure from the machine 14. A preferred way that this may be accomplished will now be described with regard to the specially-constructed change tool 120 shown in FIG. 2.

When it is desired to remove the piston/core assembly, the cylinder cap 88 is screwed off and the guide pin is screwed out of its socket. Then the change tool 120 is inserted vertically upwardly into the hollow lower end of the faucet core from below. The change tool 120 telescopically slides into the spout 52 a substantial distance until a shoulder 122 formed on the exterior of the change tool engages the lower end 124 of the core. The shoulder 122, while being sufficiently great in diameter to engage the end 124, is small enough to fit within the barrel bore 18 from below. Accordingly, after engagement at 122/124, if the change tool 120 is pushed further upwards the piston/core assembly 78/38 is pushed up and out of the barrel bore 18. (Compare FIG. 2 with FIG. 1).

The change tool 120 is a generally cylindrical rod-shaped element. It has a main, axially central portion 126 of a first diameter, a tip portion 128 above the shoulder 122 of a second somewhat smaller diameter, and a lower, handle portion 130, shown being knurled to provide the user a better handgrip.

The tip portion is shown provided with a circumferentially extending, radially outwardly opening groove 132 in which an O-ring seal member 134 is mounted. The main portion 126 is shown provided with a series of e.g. five axially spaced, circumferentially extending, radially outwardly opening grooves 136, in each of which an O-ring seal member 138 is mounted. A more protuberant O-ring seal member 140 is mounted on the change tool at the intersection of the main portion 126 and the handle 130.

Accordingly, as the tip of the change tool is inserted from below into the spout and pushed upwards as aforementioned, the O-ring 134 forms a seal between the change tool and the faucet core spout. As the change tool is pushed further upwards dislodging the piston/core assembly and pushing it upwards, the O-rings 138 enter the bore of the faucet barrel and successively seal with the peripheral wall of the barrel bore above and below the barrel inlet port 24, progressively replacing the functions of the seals 54, 56 and 58 and one another, until the stage shown in FIG. 2 is reached. The achievement of this stage is signalled by the abutment of the lower end of the faucet barrel by the seal member 140. Here at this stage, the inlet port 24 remains sealed-off, because the lowermost two of the O-rings 138 are respectively disposed above and below the inlet port 24, forming respective circumferential seals between the change tool and the faucet barrel bore peripheral wall. The lower end of the faucet core is now disposed well up in the open cylinder 22, so that the piston/core assembly may be simply lifted off the tip of the change tool 120, disassembled as much as necessary, new seals provided where necessary, reassembled, placed back on the tip of the change tool and pushed back down until the FIG. 1 level is again reached. In this reinsertion process, the faucet core seals successively take-over for the change tool seals in a reversal of the procedure described above. Then the change tool tip may be withdrawn downwardly and out of the spout and the cylinder cap 88 reinstalled. Accordingly, by this easy means it is possible to change out a faucet piston, core and/or seals of either or both, without losing FCB or pressure from the maker 14.

It should now be apparent that the faucet for frozen carbonated beverage machine as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within in the spirit and scope of the following claims.

What is claimed is:

1. A faucet for a frozen carbonated beverage machine which has an outlet conduit communicated in use to a supply of frozen carbonated beverage at an elevated, superatmospheric pressure,
said faucet comprising:
a barrel having means providing a longitudinal bore extending between two opposite ends thereof;
means providing an inlet port for said bore, communicating laterally through said barrel intermediate the ends thereof between the exterior of the barrel and said longitudinal bore;
means provided on said barrel and associated with said inlet port for connecting said inlet port to a said frozen carbonated beverage machine outlet conduit;
a piston/core assembly slidingly received in said longitudinal bore;
means providing an outlet port passageway in said piston/core assembly, including a laterally opening entrance disposed intermediate the axial extent of said assembly and an outlet spout located at one end of said piston/core assembly and communicating outwardly through one end of said barrel longitudinal bore;
means at the opposite end of said piston/core assembly defining a piston portion thereof;
keying means provided between the piston/core assembly and the barrel for maintaining the piston/core assembly so angularly oriented relative to the barrel that by axial movement of the piston/core assembly relative to the barrel, the outlet port passageway entrance may be brought into and out of communication with said inlet port in order to dispense and terminate dispensing of frozen carbonated beverage from the frozen carbonated beverage machine through the spout;
discrete means annularly slidingly sealing between the piston portion and the cylindrical cavity means of the barrel longitudinal bore, between the piston/core assembly and the barrel longitudinal bore while the outlet port passageway entrance is out of communication with the inlet port, at three levels: a first between the outlet port passageway entrance and said keying means, a second between said outlet port passageway entrance and said inlet port and a third between said inlet port and said one end of said barrel;
said keying means being further constructed and arranged to limit said axial movement in both directions between two extremes, at one of which said outlet port passageway entrance is communicated to said inlet port and at the other of which said outlet port passageway entrance is out of communication with said inlet port;

a cap removably closing the opposite end of said barrel longitudinal bore;

surface means in said barrel longitudinal bore adjacent said cap defining a cylinder cavity in the barrel;

said piston portion of said piston/core assembly being slidingly disposed in said cylinder;

said piston portion dividing said cylinder cavity into two chambers on axially opposite sides of said piston portion;

compression coil spring means effectively disposed axially between the barrel and the piston in one of said chambers for tending to axially move the piston/core assembly in a sense to bring the outlet port passageway entrance out of communication with the inlet port;

fluid pressure source conduit means communicated to the other one of said chambers, so that fluid pressure may be admitted to that chamber for axially moving the piston/core assembly in a sense to bring the outlet port passageway entrance into communication with the inlet port;

a valve interposed in said fluid pressure source conduit means, said valve including an exhaust port for venting pressure from said other chamber and being movable between two positions for selectively either communicating said other chamber to fluid pressure in one of said positions or venting said other chamber in the other of said positions;

said piston/core assembly including means for axially adjustably positioning said piston portion along the piston/core assembly correspondingly varying the volume of said other chamber and thus the amount that the piston/core assembly must be axially moved in order to bring the outlet port passageway entrance into and out of communication with said inlet port.

2. The faucet of claim 1, wherein:
the piston/core assembly includes a core portion having a threaded stem, said piston portion being threaded onto said stem to provide said axially adjustably positioning means; and locking means for maintaining any selected axial position of said piston portion on said stem.

3. The faucet of claim 1, wherein:
said keying means comprises a longitudinally elongated slot in said barrel and a laterally projecting guide pin removably secured to said piston/core assembly and projecting outwards into said slot, said slot having longitudinally opposite ends which provide respective abutment stops for said guide pin.

4. The faucet of claim 1, wherein:
said valve is a solenoid-operated valve, and further including:
an electrical circuit incorporating said solenoid-operated valve, a power supply and switching means for closing and opening said circuit relative to the solenoid operated valve.

5. The faucet of claim 4, wherein:
said solenoid operated valve includes means for automatically disposing said valve in said other position when said circuit is opened.

6. The faucet of claim 5, wherein:
said switch is a momentary contact switch for maintaining said circuit closed so long as said switch is depressed.

7. The faucet of claim 5, wherein:
said switch includes a timing means for maintaining said circuit closed only for a preselected time when said switch is depressed.

* * * * *